United States Patent
Minor (10) Patent No.: US 6,771,464 B2
(45) Date of Patent: Aug. 3, 2004

(54) PERPENDICULAR MAGNETIC RECORDING HEAD WITH A LAMINATED MAIN WRITE POLE

(75) Inventor: Michael K. Minor, Gibsonia, PA (US)

(73) Assignee: Seagate Technology LLC, Scotts Valley, CA (US)

(*) Notice: Subject to any disclaimer, the term of this patent is extended or adjusted under 35 U.S.C. 154(b) by 122 days.

(21) Appl. No.: 10/097,776

(22) Filed: Mar. 14, 2002

(65) Prior Publication Data

US 2003/0076629 A1 Apr. 24, 2003

Related U.S. Application Data

(60) Provisional application No. 60/335,086, filed on Oct. 19, 2001.

(51) Int. Cl.[7] .............................................. G11B 5/147
(52) U.S. Cl. ..................................................... 360/126
(58) Field of Search ................................ 360/317, 125, 360/126

(56) References Cited

U.S. PATENT DOCUMENTS

| | | | | |
|---|---|---|---|---|
| 4,541,026 A | | 9/1985 | Bonin et al. ................. 360/121 |
| 4,639,810 A | | 1/1987 | Sakai ........................... 360/125 |
| 4,762,755 A | * | 8/1988 | Shiiki et al. ................. 428/635 |
| 4,814,921 A | * | 3/1989 | Hamakawa et al. ......... 360/126 |
| 4,843,507 A | * | 6/1989 | Schewe et al. .............. 360/125 |
| 4,935,314 A | * | 6/1990 | Kobayashi et al. ..  428/694 ML |
| 5,161,299 A | | 11/1992 | Denison et al. ............. 360/121 |
| 5,208,714 A | | 5/1993 | Denison et al. ............. 360/121 |
| 5,439,754 A | | 8/1995 | Iwasaki et al. .............. 360/126 |
| 5,606,478 A | | 2/1997 | Chen et al. .................. 360/126 |
| 5,640,753 A | | 6/1997 | Schultz et al. ........... 29/603.08 |
| 5,668,689 A | | 9/1997 | Schultz et al. .............. 360/317 |
| 5,726,839 A | * | 3/1998 | Shinohara et al. .......... 360/318 |
| 5,777,828 A | | 7/1998 | Kameyama et al. ........ 360/126 |
| 5,808,973 A | * | 9/1998 | Tanaka ......................... 369/14 |
| 5,812,350 A | | 9/1998 | Chen et al. .................. 360/126 |
| 5,864,450 A | | 1/1999 | Chen et al. .................. 360/317 |
| 5,870,260 A | * | 2/1999 | Davies et al. ................ 360/313 |
| 5,920,979 A | | 7/1999 | Nepela et al. ........... 29/603.13 |
| 5,978,186 A | * | 11/1999 | Murata et al. ............... 360/123 |
| 6,033,792 A | | 3/2000 | Kirino et al. ................ 428/692 |
| 6,063,512 A | | 5/2000 | Osaka et al. ............. 428/694 T |
| 6,084,752 A | | 7/2000 | Sakakima et al. ........... 360/317 |
| 6,101,067 A | * | 8/2000 | Matsuzono et al. ......... 360/317 |
| 6,114,850 A | | 9/2000 | Hayashi ....................... 324/252 |
| 6,141,182 A | * | 10/2000 | Amemiya et al. ........ 360/246.1 |
| 6,285,528 B1 | * | 9/2001 | Akiyama et al. ............ 360/126 |
| 6,292,329 B1 | * | 9/2001 | Sato et al. ................... 360/126 |
| 6,317,290 B1 | | 11/2001 | Wang et al. ................. 360/126 |
| 2003/0076627 A1 | * | 4/2003 | Minor et al. ................. 360/125 |

FOREIGN PATENT DOCUMENTS

| | | | | |
|---|---|---|---|---|
| JP | 59-162610 A | * | 9/1984 |
| JP | 2-235211 A | * | 9/1990 |
| JP | 4-17105 A | * | 1/1992 |
| JP | 6-162442 A | * | 6/1994 |
| JP | 7-225912 A | * | 8/1995 |
| JP | 2002-197614 A | * | 7/2002 |
| JP | 2002-197615 A | * | 7/2002 |

* cited by examiner

Primary Examiner—Jefferson Evans
(74) Attorney, Agent, or Firm—Benjamin T. Queen, II, Esq; Pietragallo, Bosick & Gordon (57) ABSTRACT

A perpendicular magnetic recording head includes a laminated main write pole and a return pole magnetically coupled to the main write pole. The main write pole includes a first magnetic layer having a high saturation magnetization, a second magnetic layer having a high saturation magnetization, and a non-magnetic interlayer positioned between the first magnetic layer and the second magnetic layer. The first and second magnetic layers may comprise, for example, $Fe_xCo_y$, wherein $40 \leq x \leq 90$ and $10 \leq y \leq 60$.

22 Claims, 6 Drawing Sheets

PERPENDICULAR MAGNETIC RECORDING HEAD WITH A LAMINATED MAIN WRITE POLE

CROSS REFERENCE TO RELATED APPLICATION

This application claims the benefit of U.S. Provisional Application No. 60/335,086 filed Oct. 19, 2001.

FIELD OF THE INVENTION

The invention relates to perpendicular magnetic recording heads, and more particularly, to a perpendicular magnetic recording head with a laminated main write pole.

BACKGROUND OF THE INVENTION

Magnetic recording heads have utility for use in a magnetic disc drive storage system. Most magnetic recording heads used in such systems today are "longitudinal" magnetic recording heads. Longitudinal magnetic recording in its conventional form has been projected to suffer from superparamagnetic instabilities at densities above approximately 40 Gbit/in$^2$. It is believed that reducing or changing the bit cell aspect ratio will extend this limit up to approximately 100 Gbit/in$^2$. However, for recording densities above 100 Gbit/in$^2$, different approaches will likely be necessary to overcome the limitations of longitudinal magnetic recording.

An alternative to longitudinal recording is "perpendicular" magnetic recording. Perpendicular magnetic recording is believed to have the capability of extending recording densities well beyond the limits of longitudinal magnetic recording. Perpendicular magnetic recording heads for use with a perpendicular magnetic storage medium may include a pair of magnetically coupled poles, including a main write pole having a small bottom surface area and a flux return pole having a larger bottom surface area. A coil having a plurality of turns is located adjacent to the main write pole for inducing a magnetic field between that pole and a soft underlayer of the storage media. The soft underlayer is located below the hard magnetic recording layer of the storage media and enhances the amplitude of the field produced by the main pole. This, in turn, allows the use of storage media with higher coercive force, consequently, more stable bits can be stored in the media. In the recording process, an electrical current in the coil energizes the main pole, which produces a magnetic field. The image of this field is produced in the soft underlayer to enhance the field strength produced in the magnetic media. The flux density that diverges from the tip into the soft underlayer returns through the return flux pole. The return pole is located sufficiently far apart from the main write pole such that the material of the return pole does not affect the magnetic flux of the main write pole, which is directed vertically into the hard layer and the soft underlayer of the storage media.

In selecting a material to form the main write pole, it is desirable to have a material that exhibits a large or high saturation magnetization ($4\pi M_s$), a low coercivity, and a well-defined uniaxial anisotropy. These factors are particularly important for a perpendicular magnetic recording head which utilizes a deep gap field to perform a write operation, as opposed to a fringing field utilized by a longitudinal magnetic recording head.

For example, one of the highest saturation magnetizations at room temperature is if exhibited by the material $Fe_{65}Co_{35}$ which has a saturation magnetization value of approximately 2.4 T. However, certain properties exhibited by this material prevent it from being suitable for use as a main write pole material. Specifically, this material is not sufficiently magnetically soft or uniaxial, therefore, it has a nearly zero permeability which results in an inefficient write head. The lack of uniaxiality or magnetic softness is a direct result of the relatively large value of magnetocrystalline anisotropy exhibited by many of the high moment FeCo alloys. However, because of the high saturation magnetization exhibited by these materials, it would be desirable to use these materials to form the main write pole.

There is identified a need for an improved main write pole of a perpendicular magnetic recording head that overcomes limitations, disadvantages, and/or shortcomings of known main write poles.

SUMMARY OF THE INVENTION

Embodiments of the invention meet the identified need, as well as other needs, as will be more fully understood following a review of the specification and drawings.

In accordance with an aspect of the invention, a main write pole for a perpendicular magnetic recording head comprises a first magnetic layer having a high saturation magnetization, a second magnetic layer having a high saturation magnetization, and a non-magnetic interlayer positioned between the first magnetic layer and the second magnetic layer. The first and second magnetic layers comprise $Fe_xCo_y$, wherein $40 \leq x \leq 90$ and $10 \leq y \leq 60$.

In accordance with an additional aspect of the invention, a perpendicular magnetic recording head comprises a main write pole and a return pole magnetically coupled to the main write pole. The main write pole comprises a first magnetic layer having a saturation magnetization greater than about 1.8 T, a second magnetic layer having a saturation magnetization greater than about 1.8 T, and a non-magnetic interlayer positioned between the first magnetic layer and the second magnetic layer.

In accordance with an additional aspect of the invention, a perpendicular magnetic recording head comprises a main write pole and a return pole magnetically coupled to the main write pole. The main write pole comprises a first magnetic layer comprising $Fe_xCo_y$, wherein $40 \leq x \leq 90$ and $10 \leq y \leq 60$, a second magnetic layer comprising $Fe_xCo_y$, wherein $40 \leq x \leq 90$ and $10 \leq y \leq 60$, and a non-magnetic interlayer positioned therebetween.

In accordance with yet another aspect of the invention, a magnetic disc drive storage system comprises a housing, a perpendicular magnetic recording medium positioned in the housing, and a perpendicular magnetic recording head mounted in the housing adjacent the magnetic recording medium. The magnetic recording head includes a main write pole and a return pole magnetically coupled to the write pole. The main write pole includes a first magnetic layer having a high saturation magnetization, a second magnetic layer having a high saturation magnetization, and a non-magnetic interlayer positioned between the first magnetic layer and the second magnetic layer.

DETAILED DESCRIPTION OF THE INVENTION

The invention provides a perpendicular magnetic recording head, and more particularly a perpendicular magnetic recording head with a laminated main write pole. The invention is particularly suitable for use with a magnetic disc drive storage system. A recording head, as used herein, is generally defined as a head capable of performing read and/or write operations. Perpendicular magnetic recording, as used herein, generally refers to orienting magnetic domains within a magnetic storage medium substantially perpendicular to the direction of travel of the recording head and/or recording medium.

Figure 1:
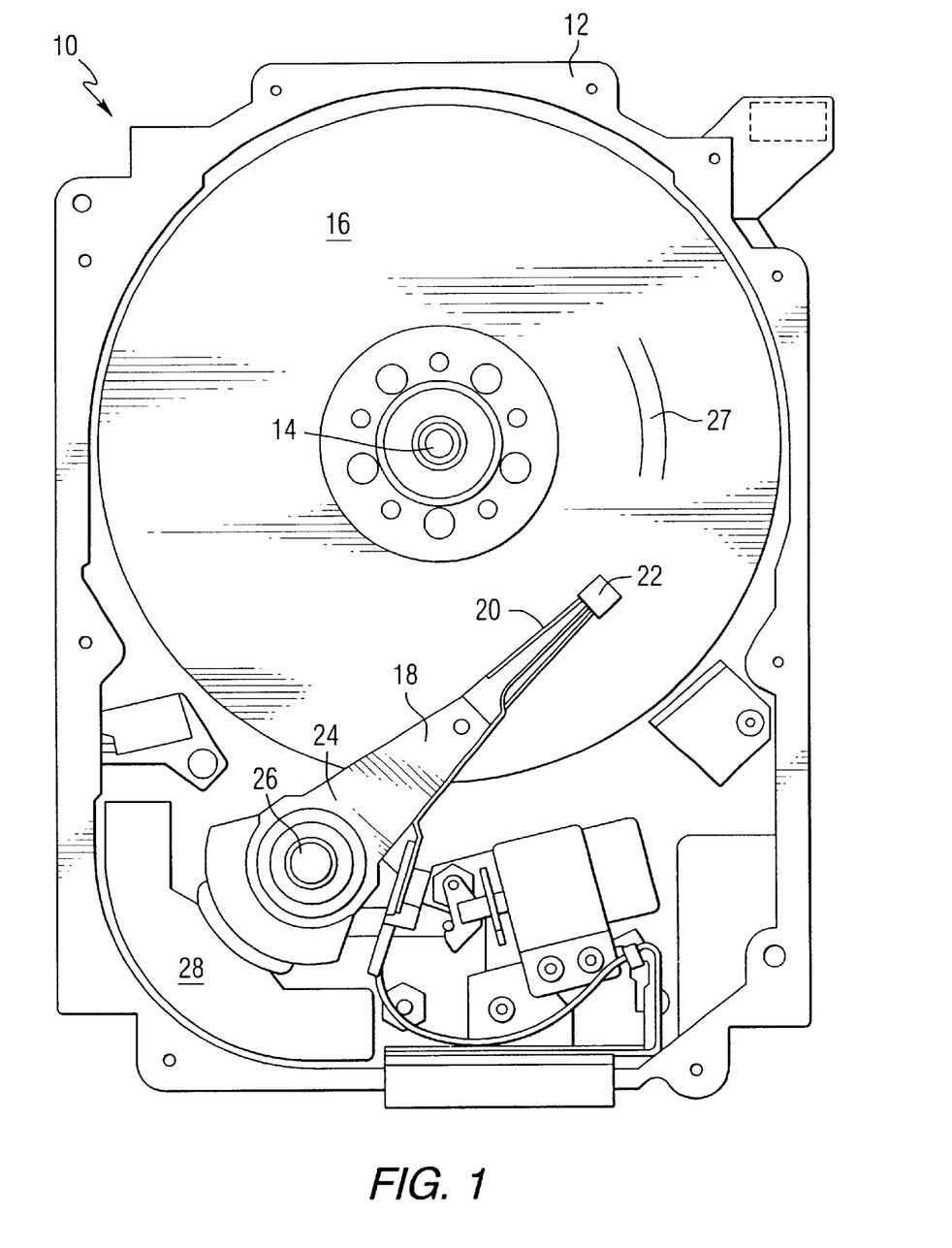
FIG. 1 is a pictorial representation of a disc drive system that may utilize a perpendicular magnetic recording head in accordance with the invention.

FIG. 1 is a pictorial representation of a disc drive 10 that can utilize a perpendicular magnetic recording head in accordance with this invention. The disc drive 10 includes a housing 12 (with the upper portion removed and the lower portion visible in this view) sized and configured to contain the various components of the disc drive. The disc drive 10 includes a spindle motor 14 for rotating at least one magnetic storage medium 16, which may be a perpendicular magnetic recording medium, within the housing, in this case a magnetic disc. At least one arm 18 is contained within the housing 12, with each arm 18 having a first end 20 with a recording head or slider 22, and a second end 24 pivotally mounted on a shaft by a bearing 26. An actuator motor 28 is located at the arm's second end 24 for pivoting the arm 18 to position the recording head 22 over a desired sector or track 27 of the disc 16. The actuator motor 28 is regulated by a controller, which is not shown in this view and is well known in the art.

Figure 2:
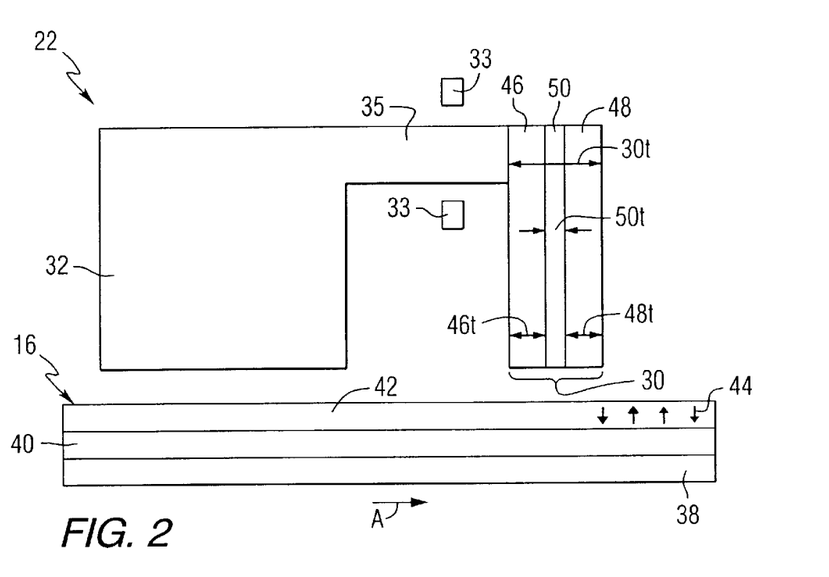
FIG. 2 is a partially schematic side view of a perpendicular magnetic recording head and a perpendicular magnetic recording medium in accordance with the invention.

FIG. 2 is a partially schematic side view of the perpendicular magnetic recording head 22 and the perpendicular recording magnetic medium 16. Specifically, the recording head 22 includes a writer section comprising a main write pole 30 and a return or opposing pole 32 that are magnetically coupled by a yoke or pedestal 35. A magnetizing coil 33 surrounds the yoke or pedestal 35 for energizing the recording head 22. The recording head 22 also includes a read head, not shown, which may be any conventional type read head as is generally known in the art.

Still referring to FIG. 2, the perpendicular magnetic recording medium 16 is positioned under the recording head 22. The recording medium 16 travels in the direction of arrow A during recording. The recording medium 16 includes a substrate 38, which may be made of any suitable material such as ceramic glass or amorphous glass. A soft magnetic underlayer 40 is deposited on the substrate 38. The soft magnetic underlayer 40 may be made of any suitable material having, for example, a relatively high moment and high permeability. A hard magnetic recording layer 42 is deposited on the soft underlayer 40, with the perpendicular oriented magnetic domains 44 contained in the hard layer 42. Suitable hard magnetic materials for the hard magnetic recording layer 42 may include at least one material selected from CoCr, FePd, CoPd, CoFePd, CoCrPd, or CoCrPt.

In accordance with the invention, the main write pole 30 is a laminated structure. Specifically, the main write pole 30 includes a first magnetic layer 46, a second magnetic layer 48, and a non-magnetic interlayer 50 positioned between the first magnetic layer 46 and the second magnetic layer 48. The first magnetic layer 46 is primarily magnetostatically coupled to the second magnetic layer 40 through the non-magnetic interlayer 50.

The first magnetic layer and/or the second magnetic layer may be formed of a material, such as, for example, $Fe_xCo_y$, wherein $40 \leq x \leq 90$ and $10 \leq y \leq 60$. The materials for the first magnetic layer 46 and the second magnetic layer 48 are selected such that the material has a high saturation magnetization. As used herein, "high" or "large" saturation magnetization generally refers to a suitable material for use with the invention having a saturation magnetization or magnetic moment greater than about 1.8 T. Such materials may include, for example, the described FeCo alloys or FeCoNi alloys that exhibit the desired level of saturation magnetization or magnetic moment.

The non-magnetic interlayer 50 may be formed of a material, such as, for example, $Al_2O_3$, or any other suitable insulating or non-magnetic material for coupling the first layer 46 to the second layer 48.

It is desirable to have a material that forms the main write pole that exhibits a relatively high saturation magnetization, a relatively low coercivity, and a well-defined uniaxial anisotropy. The materials described herein, e.g. $Fe_xCo_y$, wherein $40 \leq x \leq 90$ and $10 \leq y \leq 60$, for forming the first and second magnetic layers 46 and 48 of the main write pole 30 are known to have a relatively high saturation magnetization. However, certain properties exhibited by these materials prevent them from being suitable for use as a main write pole material. For example, these materials may not be sufficiently magnetically soft or not have a well-defined uniaxial anisotropy. These undesirable qualities also result in high moment materials, such as the FeCo alloys, having a nearly zero permeability which results in an inefficient write head. The lack of uniaxial anisotropy exhibited by many of the high moment alloys, such as the FeCo alloys, is a direct result of the relatively large value of magnetocrystalline anisotropy exhibited by these materials. Therefore, the invention takes advantage of the desired relatively high saturation magnetization exhibited by these materials while overcoming the undesirable qualities. It will be appreciated that materials other than the described FeCo alloys but which exhibit similar properties, as described herein, may be utilized in accordance with the invention.

Figure 3:
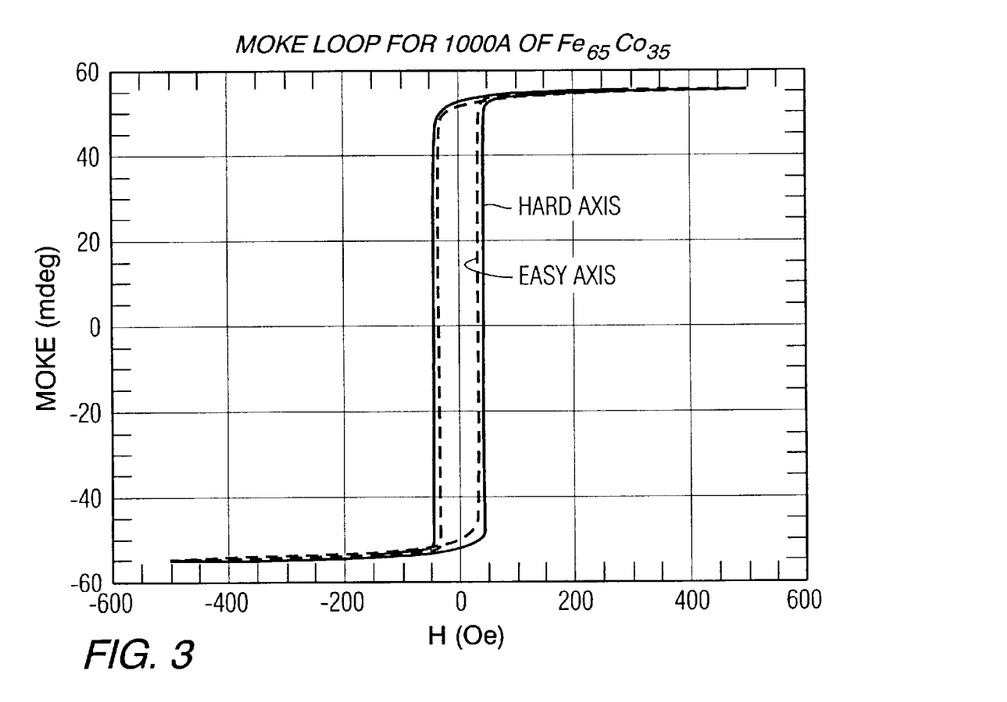
FIG. 3 illustrates Magneto Optical Kerr Effect (MOKE) loops for $Fe_{65}Co_{35}$ having a thickness of 1000 Å.

FIG. 3 illustrates Magneto Optical Kerr Effect (MOKE) loops along both an easy axis and a hard axis for the specific high moment material $Fe_{65}Co_{35}$. Specifically, FIG. 3 illustrates the problems with using $Fe_{65}Co_{35}$ as a material for forming a main write pole. As shown, $Fe_{65}Co_{35}$ exhibits a relatively high coercivity, along both the easy axis and the hard axis, of approximately 50 Oe. This material further exhibits no uniaxial anisotropy. Both of these qualities of the $Fe_{65}Co_{35}$ indicate that using this material for forming the main write pole would result in a recording head with very low efficiency and a remanence of close to $4\pi M_s$, which can result in writing/overwriting when the head is not energized.

The invention provides for utilizing the high moment materials, such as the FeCo alloys, in such a way as to reduce the coercivity and give the structure at least some degree of uniaxiality. Specifically, the invention provides for forming the main write pole 30 having a first magnetic layer 46 and a second magnetic layer 48 formed of, for example, an FeCo alloy and an interlayer 50 positioned therebetween. Depositing these materials in such a manner is necessary in order to reduce or average out the described magnetocrystalline anisotropy of the particular high moment alloy selected. This results in the main write pole 30 having the desired high saturation magnetization, a low coercivity and a well defined uniaxial anisotropy, as will be illustrated herein. For example, the grain size of the FeCo alloys is kept relatively small by depositing thin layers of the FeCo alloys. While this results in reducing the coercivity of the FeCo, the thickness necessary to maintain the low coercivity is not sufficient for forming the main write pole. However, by laminating the structure with the non-magnetic interlayer 50, the grain size of the FeCo alloys may be kept small while providing reduced coercivity. Furthermore, the correct choice of the thickness for the interlayer 50 will provide a means for magnetostatic coupling between the adjacent FeCo alloy layers, i.e. between the first magnetic layer 46 and the second magnetic layer 48, resulting in a sufficient degree of uniaxiality for forming the main write pole.

To illustrate the invention, reference is made to FIGS. 4-10. Specifically, a main write pole, such as main write pole 30 was formed with the following structure: $Si\backslash SiO_2\backslash (X\text{Å}\ Fe_{65}Co_{35}\backslash t\text{Å}\ Al_2O_3)\times 10$, where t=0, 10, 20 and 50 and where X=50, 100 and 200. The $Fe_{65}Co_{35}$ layer of material corresponds to the first magnetic layer 46 and the $Al_2O_3$ layer of material corresponds to the interlayer 50. This structure, while repeated ten times for illustration purposes herein, may be structured in various arrangements, such as illustrated in FIG. 2 where the second magnetic layer 48 provides an additional layer of $Fe_{65}Co_{35}$ or alternatively, the structure set forth above may be repeated up to, for example, thirty times. The limiting factor for the number of times of repeating the structure is, generally, the overall desired thickness 30t of the main write pole 30, wherein the thickness 30t may be in the range from about 500 Å to about 5000 Å.

In the structure set forth above, $Si\backslash SiO_2$ is a substrate material upon which the write pole structure was formed. These structures were prepared, for example, via dc magnetron physical vapor deposition from a $Fe_{65}Co_{35}$ alloy target and rf magnetron physical vapor deposition from an $Al_2O_3$ target. The deposition pressure was 3.0 mtorr and ultrahigh purity Ar was used as the process gas. The substrates were 150 mm round Si(100) with 5000 Å of thermal oxide.

Figure 4:
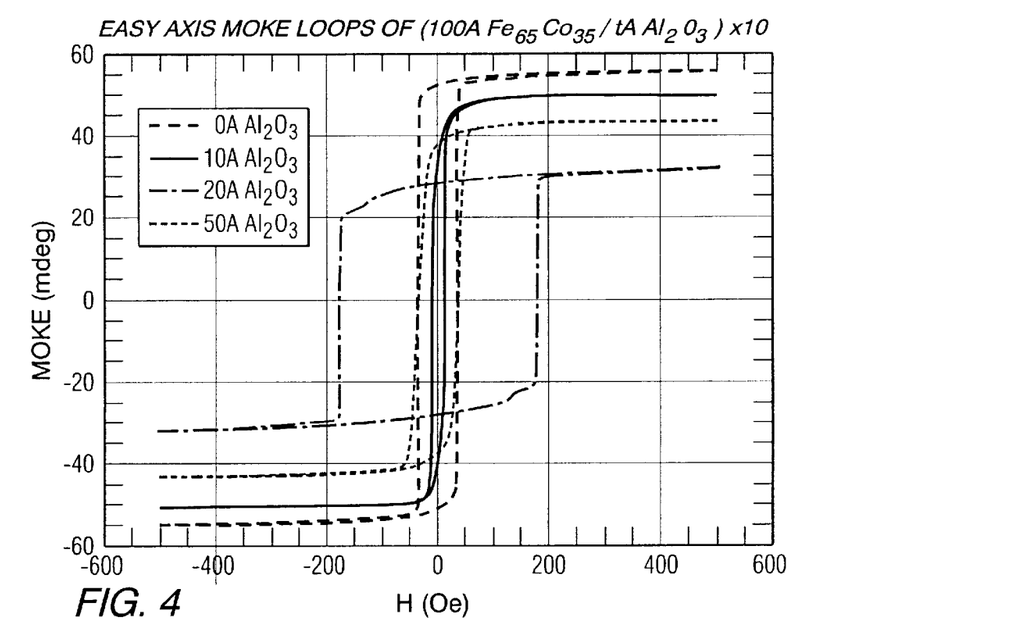
FIG. 4 illustrates easy axis MOKE loops for $(100A\ Fe_{65}Co_{35}/tA\ Al_2O_3)\times 10$ wherein t=0, 10, 20, and 50.
Figure 5:
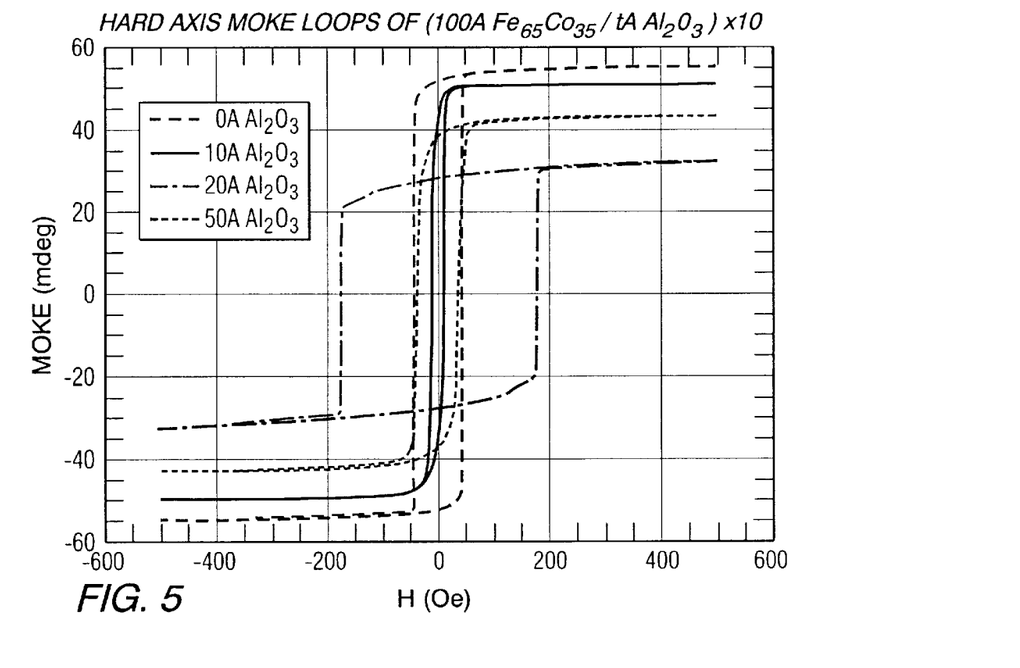
FIG. 5 illustrates hard axis MOKE loops for $(100A\ Fe_{65}Co_{35}/tA\ Al_2O_3)\times 10$ wherein t=0, 10, 20, and 50.
Figure 6:
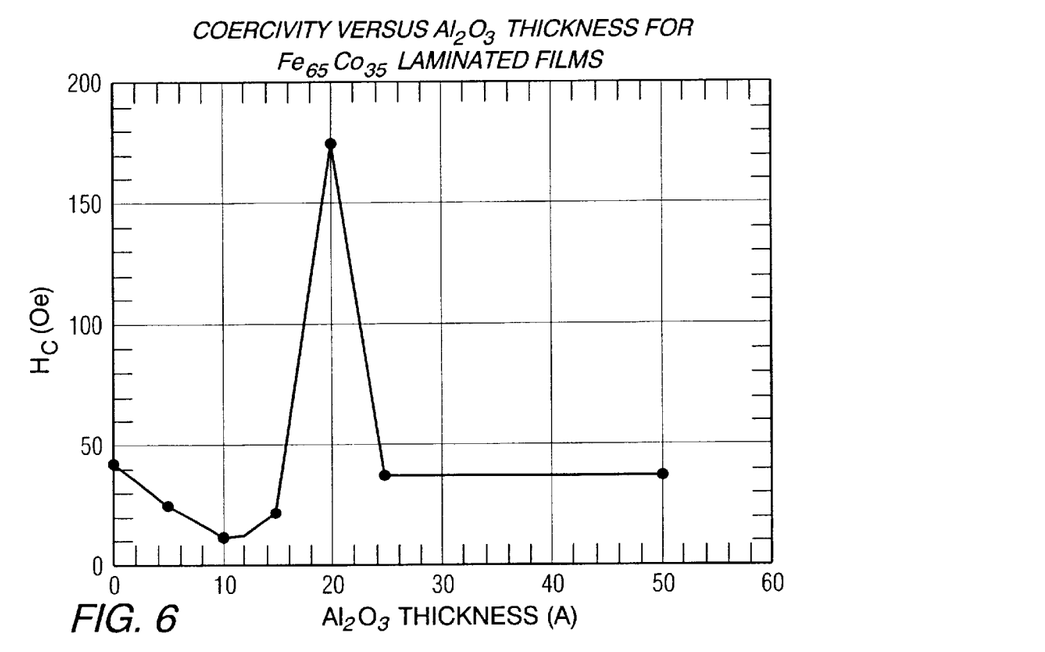
FIG. 6 is a graphical illustration of coercivity versus interlayer thickness for $Fe_{65}Co_{35}$ laminated films.

FIG. 4 illustrates a plurality of MOKE loops along an easy axis for different thicknesses of the interlayer 50 when formed of $Al_2O_3$. Similarly, FIG. 5 shows a plurality of MOKE loops along a hard axis for different thicknesses of the interlayer 50 when formed of $Al_2O_3$. The results set forth in FIG. 4 were utilized to determine an optimum interlayer 50 thickness for the layer of $Fe_{65}Co_{35}$ having a thickness of 100 Å, as discussed in more detail herein and as illustrated in FIG. 6. FIG. 5 illustrates that qualitatively the interlayer 50 transforms from isotropic to uniaxial and back to isotropic as the thickness is varied.

The easy axis coercivities obtained from the MOKE loops in FIG. 4 are plotted in FIG. 6 versus the different thicknesses for the interlayer 50. (FIG. 6 also contains additional information for different thicknesses of the interlayer 50 that were experimentally obtained but not illustrated in FIGS. 4 and 5.) Specifically, FIG. 6 illustrates that as the $Al_2O_3$ material thickness used to form the interlayer 50 is increased to approximately 10 Å, the coercivity drops to approximately its lowest value. As the thickness increases past 10 Å, FIG. 6 illustrates that the coercivity has a sharp peak and then decreases once again. Therefore, it was concluded that the interlayer 50 having approximately a 10 Å thickness is the optimum thickness level for a 100 Å thickness layer of $Fe_{65}Co_{35}$. It will be appreciated that the optimum thickness for the interlayer 50 may vary depending upon any of the following: the thickness of the layer of $Fe_{65}Co_{35}$; the exact composition of the FeCo alloy used; the specific material used to form the interlayer 50; or on the number of layers used to form the structure. Accordingly, in accordance with the invention, the non-magnetic interlayer 50 should have a thickness in the range of about 5 Å to about 15 Å when taking into consideration the various factors described above.

Figure 7:
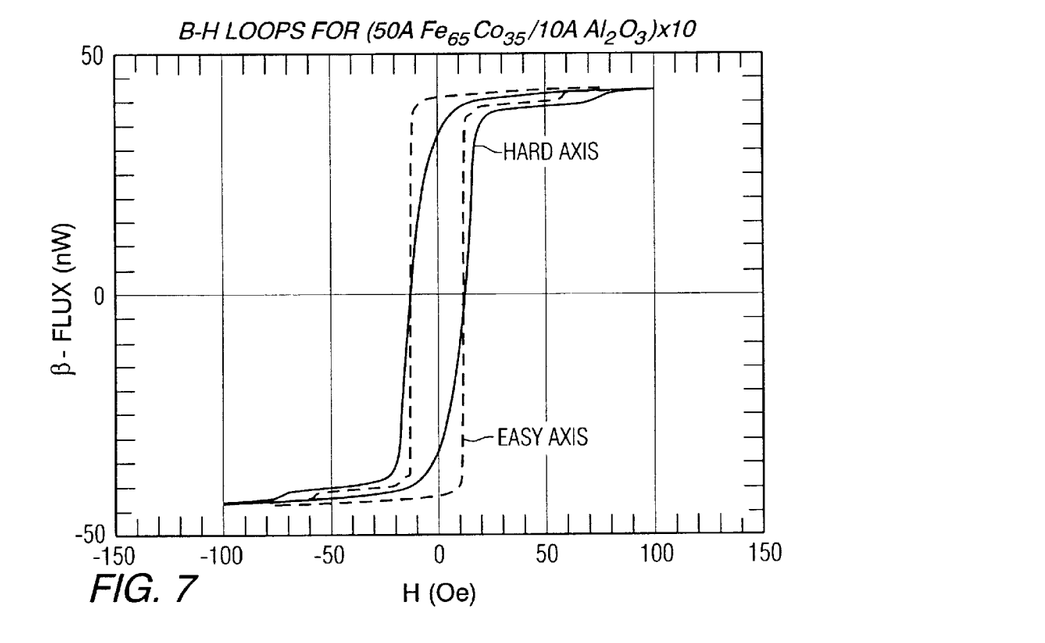
FIG. 7 illustrates B-H loops for $(50A\ Fe_{65}Co_{35}/10A\ Al_2O_3)\times 10$.
Figure 8:
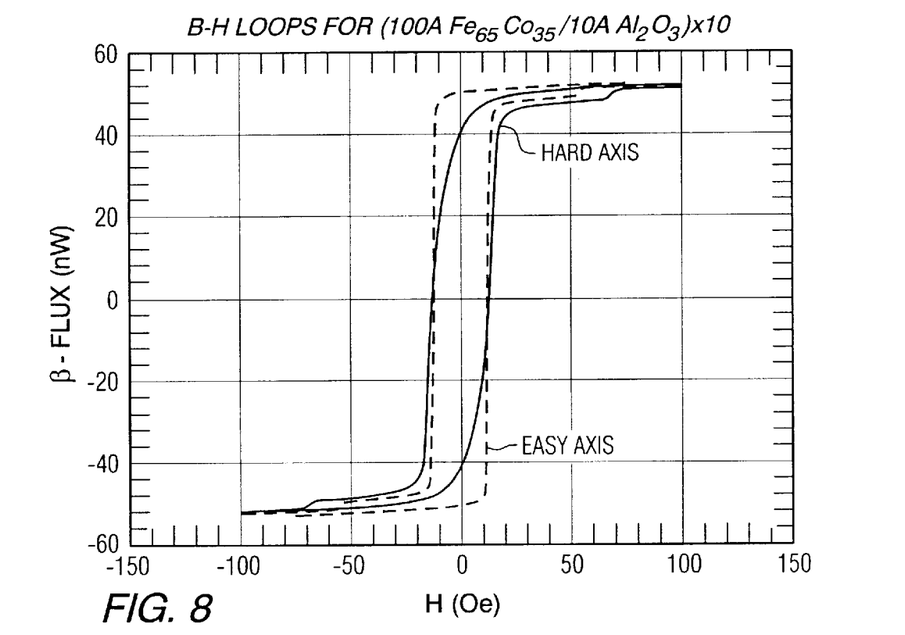
FIG. 8 illustrates B-H loops for $(100A\ Fe_{65}Co_{35}/10A\ Al_2O_3)\times 10$.
Figure 9:
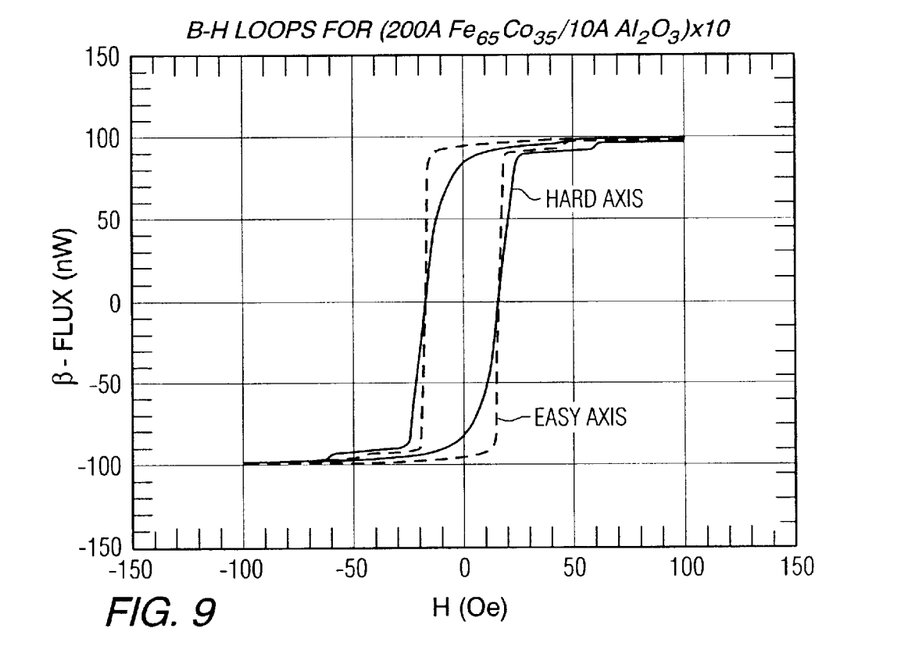
FIG. 9 illustrates B-H loops for $(200A\ Fe_{65}Co_{35}/10A\ Al_2O_3)\times 10$.

FIGS. 7–9 illustrate B—H loops along both the easy axis and the hard axis for the material $(X\text{Å}\ Fe_{65}Co_{35}/10\ \text{Å}\ Al_2O_3)\times 10$, where X=50, 100, and 200. As indicated, a constant thickness of 10 Å was used for the interlayer 50, i.e. the layer of $Al_2O_3$.

Figure 10:
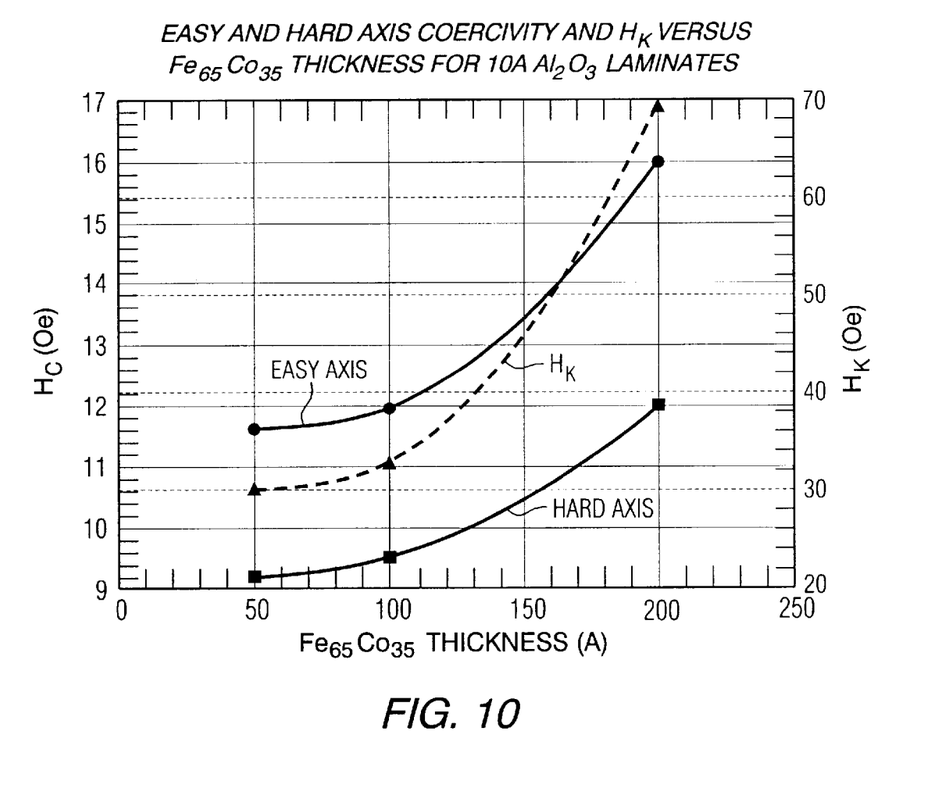
FIG. 10 graphically illustrates easy and hard axis coercivity and $H_K$ versus $Fe_{65}Co_{35}$ thickness for 10 Å $Al_2O_3$ laminates.

FIG. 10 graphically illustrates easy and hard axis coercivity and $H_K$ versus $Fe_{65}Co_{35}$ thickness, as determined from the B—H loops set forth in FIGS. 7-9. Specifically, FIG. 10 shows that the minimum coercivity and minimum $H_K$ occur at a $Fe_{65}Co_{35}$ approximate thickness of 50 Å. This result is due to the average in-plane grain size being smaller for thinner layers of the $Fe_{65}Co_{35}$. Furthermore, by laminating the $Fe_{65}Co_{35}$ with only 10 Å of $Al_2O_3$, the resulting structure exhibits a significantly decreased coercivity and a degree of uniaxial anisotropy which would allow for the structure to be efficiently used as a main write pole 30.

Based on the results set forth in FIG. 10, the first magnetic layer 46 and the second magnetic layer 48 may each have a thickness in the range from about 25 Å to about 100 Å. The range of thickness for the layers 46 and 48 will depend upon, for example, the specific composition of the FeCo alloy used, the thickness of the interlayer 50 and the material selected.

Based on the results set forth herein, a main write pole 30 constructed in accordance with the invention will result in a write pole having a coercivity along a hard axis thereof of less than about 12 Oe. In addition, the write pole will have a coercivity along an easy axis thereof of less than about 12 Oe.

Whereas particular embodiments have been described herein for the purpose of illustrating the invention and not for the purpose of limiting the same, it will be appreciated by those of ordinary skill in the art that numerous variations of the details, materials, and arrangement of parts may be made within the principle and scope of the invention without departing from the invention as described in the appended claims.

What is claimed is:

1. A main write pole for a perpendicular magnetic recording head comprising:

a first magnetic layer having a saturation magnetization greater than about 1.8 T;

a second magnetic layer having a saturation magnetization greater than about 1.8 T; and a non-magnetic interlayer positioned between said first magnetic layer and said second magnetic layer.

2. The main write pole of claim 1, wherein said first magnetic layer and/or said second magnetic layer comprises $Fe_xCo_y$, and $40 \leq x \leq 90$ and $10 \leq y \leq 60$.

3. The main write pole of claim 1, wherein said first magnetic layer and/or said second magnetic layer each have a thickness from about 25 angstroms to about 100 angstroms.

4. The main write pole of claim 1, wherein said non-magnetic interlayer comprises $Al_2O_3$.

5. The main write pole of claim 1, wherein said non-magnetic interlayer has a thickness of about 5 angstroms to about 15 angstroms.

6. The main write pole of claim 1, further including:
a third magnetic layer having a high saturation magnetization; and
an additional interlayer positioned between said second magnetic layer and said third magnetic layer.

7. The main write pole of claim 6, wherein said third magnetic layer comprises $Fe_xCo_y$ and $40 \leq x \leq 90$ and $10 \leq y \leq 60$.

8. The main write pole of claim 6, wherein said third magnetic layer has a thickness from about 25 angstroms to about 100 angstroms.

9. A perpendicular magnetic recording head, comprising:
a main write pole; and
a return pole magnetically coupled to said main write pole,
said main write pole comprising:
a first magnetic layer having a saturation magnetization greater than about 1.8 T;
a second magnetic layer having a saturation magnetization greater than about 1.8 T; and
a non-magnetic interlayer positioned between said first magnetic layer and said second magnetic layer.

10. The perpendicular magnetic recording head of claim 9, wherein said write pole has a coercivity along a hard axis thereof less than about 12 Oe.

11. The perpendicular magnetic recording head of claim 9, wherein said write pole has a coercivity along an easy axis thereof less than about 12 Oe.

12. The perpendicular magnetic recording head of claim 9, wherein said first magnetic layer and/or said second magnetic layer comprise $Fe_xCo_y$ and $40 \leq x \leq 90$ and $10 \leq y \leq 60$.

13. The perpendicular magnetic recording head of claim 9, wherein said first magnetic layer and/or said second magnetic layer has a thickness from about 25 angstroms to about 100 angstroms.

14. The perpendicular magnetic recording head of claim 9, wherein said non-magnetic interlayer comprises $Al_2O_3$.

15. The perpendicular magnetic recording head of claim 9, wherein said non-magnetic interlayer has a thickness of about 5 angstroms to about 15 angstroms.

16. A perpendicular magnetic recording head, comprising:
a main write pole; and
a return pole magnetically coupled to said main write pole,
said main write pole comprising:
a first magnetic layer comprising $Fe_xCo_y$, wherein $40 \leq x \leq 90$ and $10 \leq y \leq 60$;
a second magnetic layer comprising $Fe_xCo_y$, wherein $40 \leq x \leq 90$ and $10 \leq y \leq 60$; and
a non-magnetic interlayer positioned between said first magnetic layer and said second magnetic layer.

17. The perpendicular magnetic recording head of claim 16, wherein said first magnetic layer and/or said second magnetic layer has a thickness from about 25 angstroms to about 100 angstroms.

18. The perpendicular magnetic recording head of claim 16, wherein said non-magnetic interlayer comprises $Al_2O_3$.

19. The perpendicular magnetic recording head of claim 16, wherein said non-magnetic interlayer has a thickness of about 5 angstroms to about 15 angstroms.

20. A magnetic disc drive storage system, comprising:
a housing;
a perpendicular magnetic recording medium positioned in said housing;
a perpendicular magnetic recording head mounted in said housing adjacent said magnetic recording medium, said perpendicular magnetic recording head comprising:
a main write pole; and
a return pole magnetically coupled to said main write pole,
said main write pole comprising:
a first magnetic layer having a saturation magnetization greater than about 1.8 T;
a second magnetic layer having a saturation magnetization greater than about 1.8 T; and
a non-magnetic interlayer positioned between said first magnetic layer and said second magnetic layer.

21. The system of claim 20, wherein said main write pole has a thickness in the range of about 500 angstroms to about 5000 angstroms.

22. The system of claim 20, wherein said first and second magnetic layers comprise $Fe_xCo_y$ and $40 \leq x \leq 90$ and $10 \leq y \leq 60$.

* * * * *

UNITED STATES PATENT AND TRADEMARK OFFICE
CERTIFICATE OF CORRECTION

PATENT NO.   : 6,771,464 B2
DATED        : August 3, 2004
INVENTOR(S)  : Michael K. Minor It is certified that error appears in the above-identified patent and that said Letters Patent is hereby corrected as shown below:

Column 1,
Line 66, "temperature is if exhibited" should read -- temperature is exhibited --.

Signed and Sealed this

Twentieth Day of December, 2005

JON W. DUDAS
*Director of the United States Patent and Trademark Office*